United States Patent [19]
McLeod et al.

[11] Patent Number: 6,111,828
[45] Date of Patent: Aug. 29, 2000

[54] FOCUS ERROR SIGNAL GENERATION USING CONFOCALLY FILTERED DETECTION

[75] Inventors: Robert R. McLeod, Morgan Hill; Mark E. McDonald, Mountain View, both of Calif.

[73] Assignee: Siros Technologies, Inc., San Jose, Calif.

[21] Appl. No.: 09/229,140

[22] Filed: Jan. 12, 1999

[51] Int. Cl.[7] .................................................. G11B 7/09
[52] U.S. Cl. ...................... 369/44.23; 369/112; 369/118
[58] Field of Search ............................. 369/44.23, 44.24, 369/44.25, 44.27, 44.28, 44.41, 118, 112

[56] References Cited

U.S. PATENT DOCUMENTS

| | | | |
|---|---|---|---|
| 4,318,581 | 3/1982 | Guest et al. ............................. 350/3.74 |
| 4,458,345 | 7/1984 | Bjorklund et al. ...................... 369/103 |
| 4,467,462 | 8/1984 | Shibata .................................... 369/45 |
| 4,775,966 | 10/1988 | Ohsato .................................... 369/46 |
| 4,924,455 | 5/1990 | Fujie et al. ............................. 369/44.21 |
| 5,202,875 | 4/1993 | Rosen et al. ............................ 369/94 |
| 5,263,011 | 11/1993 | Maeda et al. .......................... 369/44.27 |
| 5,283,777 | 2/1994 | Tanno et al. ............................ 369/108 |
| 5,408,453 | 4/1995 | Holtslag et al. ....................... 369/44.23 |
| 5,430,701 | 7/1995 | Ito et al. ............................. 369/44.23 X |
| 5,499,231 | 3/1996 | Fennema et al. ....................... 369/124 |
| 5,513,158 | 4/1996 | Ohsato .................................. 369/44.23 |
| 5,526,336 | 6/1996 | Park et al. ................................. 369/94 |
| 5,559,773 | 9/1996 | Kentatsu et al. ...................... 369/44.42 |
| 5,590,110 | 12/1996 | Sato ................................. 369/44.24 X |
| 5,610,895 | 3/1997 | Izumi et al. .......................... 369/118 X |
| 5,627,814 | 5/1997 | Lee .......................................... 369/116 |
| 5,671,207 | 9/1997 | Park ........................................ 369/112 |
| 5,682,372 | 10/1997 | Yamakawa et al. ....................... 369/94 |
| 5,691,971 | 11/1997 | Kim ....................................... 369/112 |
| 5,696,743 | 12/1997 | Kawasaki et al. ......................... 369/32 |
| 5,701,288 | 12/1997 | Seong .................................... 369/112 |
| 5,737,294 | 4/1998 | Yamakawa et al. ....................... 369/99 |
| 5,737,295 | 4/1998 | Lee .......................................... 369/103 |
| 5,740,136 | 4/1998 | Tsutsui et al. ...................... 369/44.25 |
| 5,748,597 | 5/1998 | Kim .......................................... 369/94 |
| 5,754,512 | 5/1998 | Komma et al. ......................... 369/112 |
| 5,757,744 | 5/1998 | Akkermans ......................... 369/44.25 |
| 5,764,606 | 6/1998 | Fukumoto et al. .................. 369/44.41 |
| 5,768,242 | 6/1998 | Juday ...................................... 369/103 |
| 5,790,493 | 4/1998 | Takeya et al. ............................ 369/58 |
| 5,793,720 | 8/1998 | Nishikata ............................. 369/44.25 |
| 5,793,721 | 8/1998 | Akkermans ......................... 369/44.27 |
| 5,811,789 | 9/1998 | Nix ...................................... 250/201.2 |

*Primary Examiner*—Muhammad Edun
*Attorney, Agent, or Firm*—Sierra Patent Group, Ltd.

[57] ABSTRACT

A focus error signal generator device including first and second optical lenses disposed in the respective paths of first and second light beams derived from the return read beam wherein the first and second optical lens have corresponding points of focus, and first and second detectors disposed in the corresponding paths of the first and second light beams located after the points of focus. First and second pinholes are disposed in the corresponding paths of the first and second light beams after the corresponding optical lens and before the corresponding detector, and an electrical differencing circuit having inputs to the first and second detectors and an output to an optical head servo system. A method for focus error signal includes the steps of focussing first and second light beams derived from a return read beam at corresponding first and second points of focus; providing for first and second detectors disposed in the path of corresponding first and second light beams after corresponding first and second points of focus; providing for first and second pinholes in the path of corresponding first and second light beams; and generating a focus error signal related to the difference between the output of the first detector and an output of the second detector. An optical data delivery and detection system comprises a laser source emitting a light beam, an optical head that receives the light beam, optical lenses within the optical head that focus the light beam on an optical storage media, a data detector that receives the light beam on the beam's return path and provides data signals and the focus error generator device described above.

18 Claims, 10 Drawing Sheets

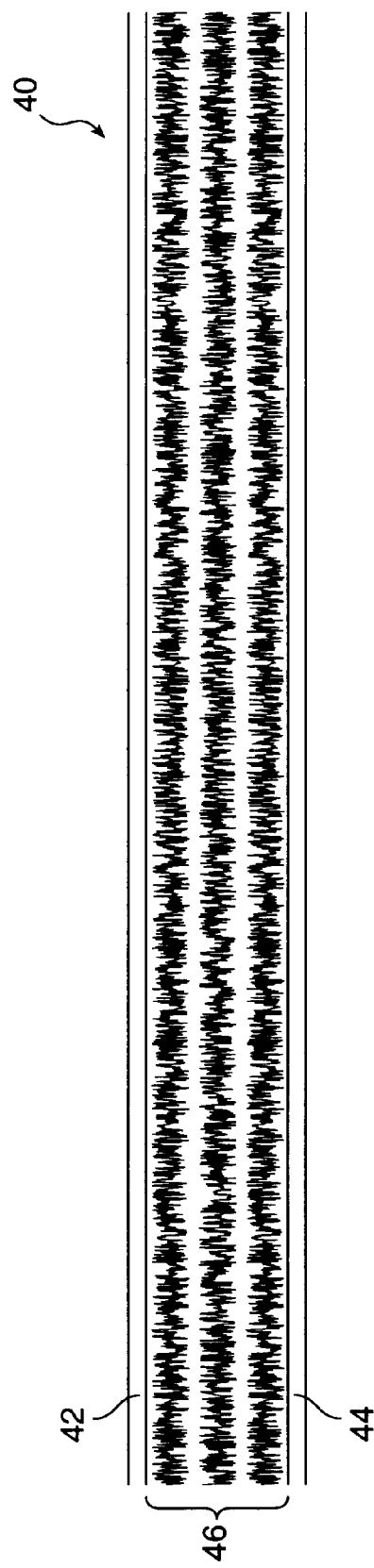

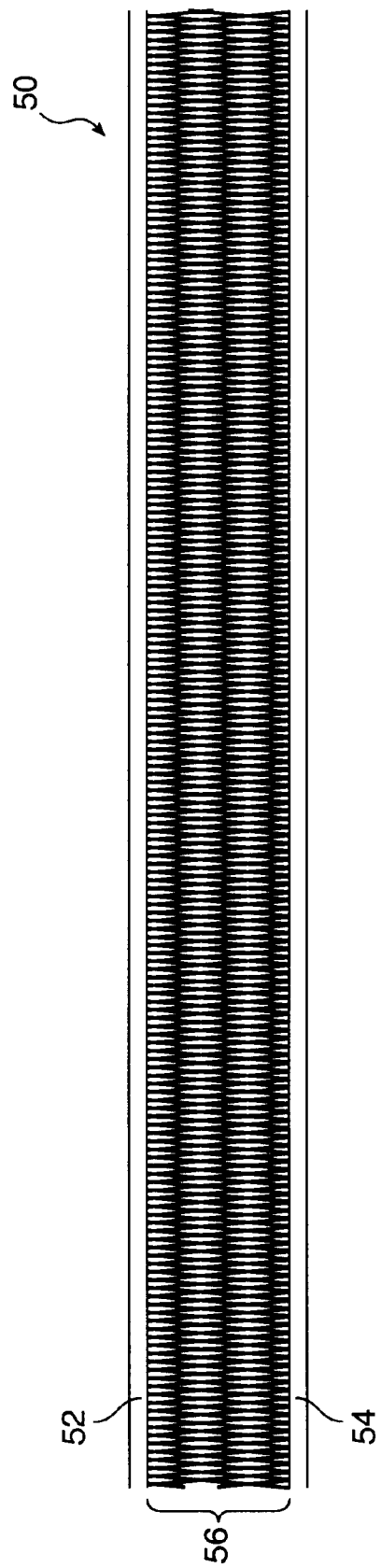

FOCUS ERROR SIGNAL GENERATION USING CONFOCALLY FILTERED DETECTION

BACKGROUND OF THE INVENTION

1. Field of the Invention

The present invention relates to the generation of focus error signals for use in the auto-focussing of optical data storage and retrieval systems. More specifically, the present invention relates to a method and apparatus for generating focus error signals based upon confocally filtering a return read beam having two distinct focal planes through a pinhole and deriving a focus error signal based upon the difference in location of the two focal planes in relation to the location of the pinhole.

2. Background

As a prerequisite to successful optical data storage, the optical head containing the focussing optics must be positioned properly within the storage layer of the optical storage medium. When recording or retrieving optical data it is essential that the optical head be positioned precisely at the desired storage point. Proper positioning of the optical head is typically carried out through auto-focusing techniques implemented by a servo system within the optical head. The signals that drive the auto-focussing process are generated by Focus Error Signal (FES) generator devices that are incorporated into the overall scheme of the optical delivery and detection system.

FES generator devices within optical delivery and detection systems have typically only been required to provide signals in instances where data storage is limited to a single or to a few layers within the optical storage medium. Current technology is generally limited to performing optical data storage on a minimal number of layers within the optical storage medium. In most instances, these layers have, generally, about 60 micron separation between adjacent layers. When such a pronounced distance separates the layers, the current FES generator devices are sufficient because layer separation does not present an issue.

However, as technological advances in data storage are made, the capability presents itself to store data on numerous layers within the storage medium. See for example U.S. patent application Ser. No. 09/016,382 filed on Jan. 30, 1998, in the name of inventor Hesselink et. al. (assigned to the assignors of the present invention) entitled "Optical Data Storage by Selective Localized Alteration of a Format Hologram" for a detailed discussion of layer definition by format hologram grating structures. That disclosure is hereby expressly incorporated herein by reference as if set forth fully herein.

When data storage is performed on multiple layers the distance separating such layers is minimized. As the separation between the layers shrinks to the about 3 to about 10 micron ranges, the ability to separate out these layers during focus error signal detection becomes more of a concern. The prior art methods are not capable of delineating between layers that are packed so closely together. The present invention serves to provide an FES generator device and a method for FES generation that is capable of differentiating the layers in optical storage medium that have numerous tightly packed layers separated at distances comparable to the Rayleigh range of the illuminating beam. Additionally, the FES generator device and the method of FES generation described herein can be used with a data storage device having multiple storage layers residing at discrete media layers spaced at distances that can be comparable to or substantially longer than the Rayleigh range.

BRIEF DESCRIPTION OF THE INVENTION

Briefly, and in general terms, one embodiment of the present invention comprises an improved focus error signal generator device including first and second optical lenses disposed in the respective paths of first and second light beams derived from the return read beam wherein the first and second optical lens have corresponding points of focus, and first and second detectors disposed in the corresponding paths of the first and second light beams located after the points of focus. First and second pinholes are disposed in the corresponding paths of the first and second light beams after the corresponding optical lens and before the corresponding detector, and an electrical differencing circuit having inputs to the first and second detectors and an output to an optical head servo system.

Another aspect of the present invention comprises a method for focus error signal generation including the steps of focussing first and second light beams derived from a return read beam at corresponding first and second points of focus; providing for first and second detectors disposed in the path of corresponding first and second light beams after corresponding first and second points of focus; providing for first and second pinholes in the path of corresponding first and second light beams; and generating a focus error signal related to the difference between the output of the first detector and an output of the second detector.

Additionally, another embodiment of the present invention comprises an optical data delivery and detection system comprising a laser source emitting a light beam, an optical head that receives the light beam, optical lenses within the optical head that focus the light beam on an optical storage media, a data detector that receives the light beam on the beam's return path and provides data signals and a focus error generator device as described herein.

BRIEF DESCRIPTION OF THE FIGURES

FIGS. 3A and 3B are cross sectional views of the optical storage devices containing the format hologram grating structures depicted in FIGS. 2A and 2B, respectively.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1A:
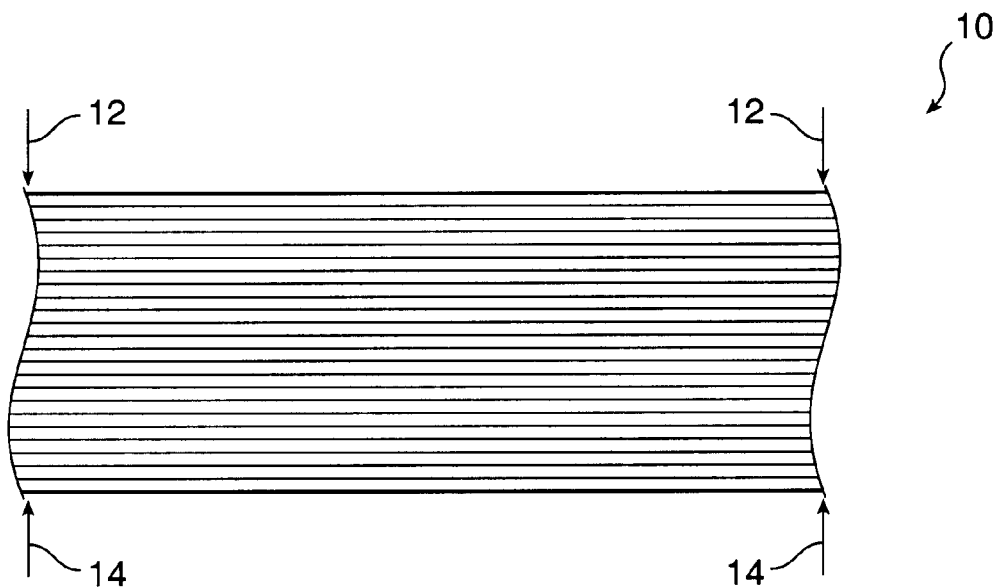
FIG. 1A is an illustration of a simple format hologram grating structure being written by exposing holographic storage medium to two beams of mutually coherent light.
Figure 1B:
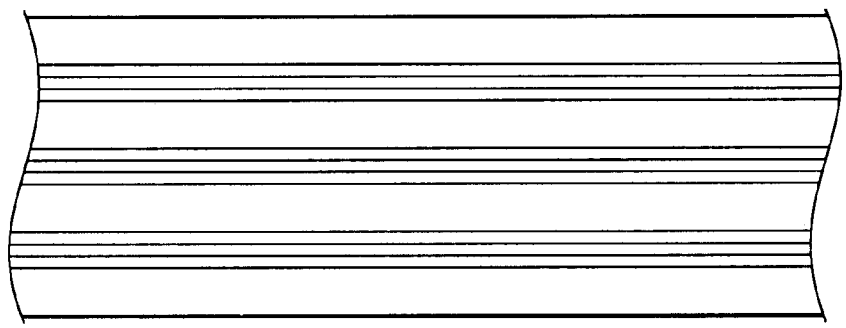
FIG. 1B is an illustration of a complex format hologram grating structure having layer definition generated by superimposing two planar hologram gratings whose vectors are perpendicular to the storage medium surface.

Referring to FIG. 1A, a simple format volume hologram 10 is written by exposing a holographic material to two beams of mutually coherent light. In particular, two plane waves incident from opposing sides generate a planar reflection hologram, whose orientation and spatial frequency are governed by the wavelength and angles of incidence of the beams. For example, Beam 12 and Beam 14 are incident on opposite sides of the material. For optimal reflection, the hologram is Bragg-matched at the readout to a range of angles within the cone of the focused readout beam. This property is the basis of data storage by selective localized alteration of a format hologram grating structure. Confocal detection isolates the light reflected from the focus. The selective localized alteration serves to change the reflectivity at the waist of a focused beam that can be measured using confocal detection; in this manner, data are represented by the localized changes in reflectivity of the format hologram. A variety of complex format holograms can be generated, including layer definition by superimposing two planar hologram gratings whose vectors are perpendicular to the medium surface, as shown schematically in FIG. 1B.

Figure 2A:
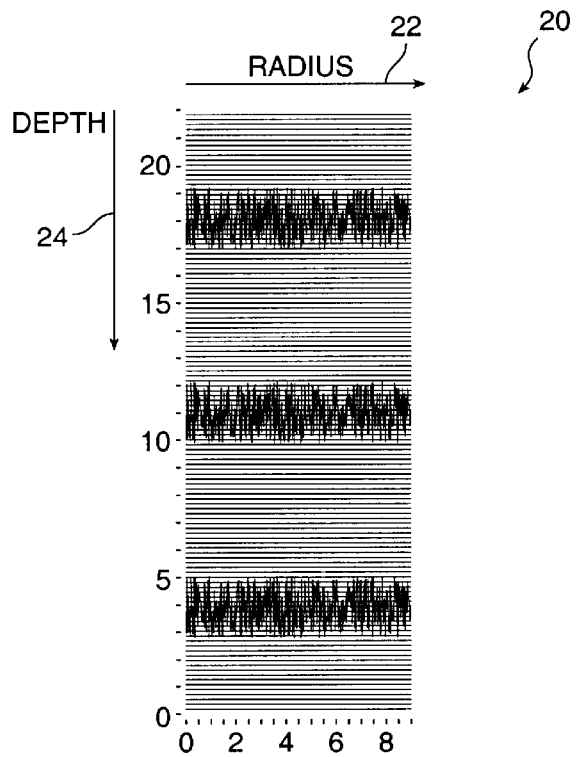
FIGS. 2A and 2B are cross sectional views of format hologram grating structures having two and four constituent holograms, respectively, for track and layer definition.
Figure 2B:
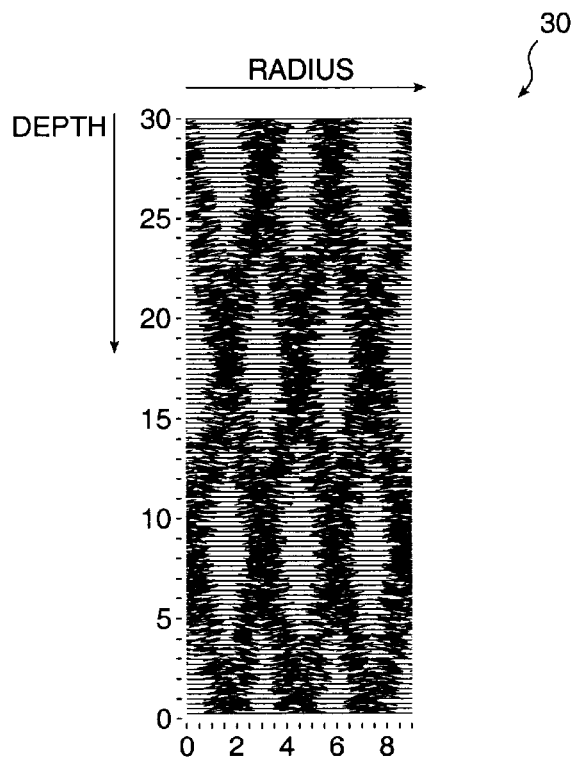

FIGS. 2A and 2B and corresponding FIGS. 3A and 3B are presented here as examples of storage medium that have multiple storage layers, closely spaced, at distances comparable to the Rayleigh range of the illuminating beam. In particular, FIGS. 2A and 2B and corresponding FIGS. 3A and 3B illustrate multiple storage layers within a bulk storage medium. The Rayleigh range storage media that is similar to the one shown here will benefit greatly from the Focus Error Signal (FES) Generator device of the present invention. Further, the present invention will also perform with storage medium having multiple storage layers residing at separate depths in the storage media spaced at distances that can be substantially longer than the Rayleigh range. The Rayleigh range of an illuminating beam is defined as the depth of focus, i.e. the distance over which the point of focus is within twice its minimum diameter. The Rayleigh range is well known by those of ordinary skill in the art.

Referring now to FIG. 2A and FIG. 2B, format hologram grating structures having complex structures for layer and track definition are shown. FIG. 2A shows a cross sectional view of a format hologram grating structure 20 having two constituent holograms for track and layer definition. The radius of the format hologram grating structure is represented by the horizontal axis 22 and the depth of the format hologram grating structure is represented by the vertical axis 24. FIG. 2B shows a format hologram grating structure 30 having four constituent hologram gratings for track and layer definition. These constituent holograms exist throughout the entire volume and locally interfere to produce a reflection hologram grating structure with a spatially varying envelope, as shown in FIGS. 2A and 2B. Methods for generating such format hologram grating structures are omitted from this disclosure in order to avoid overcomplicating the disclosure. For a detailed disclosure of generating two and four constituent format holograms and format hologram grating structures see, for example, U.S. patent application Ser. No. 09/016,382 filed on Jan. 30, 1998, in the name of inventors Hesselink et. al. entitled "Optical Data Storage by Selective Localized Alteration of a Format Hologram" and U.S. patent application Ser. No. 09/229,457 (atty. docket SIROS-98034) filed on Jan. 12, 1999, in the name of inventors Daiber et. al., entitled "Volumetric Track Definition for Data Storage Media Used to Record Data by Selective Alteration of a Format Hologram".

FIG. 3A is a cross-sectional view of storage device 40 corresponding to the format hologram grating structure of FIG. 2A. A transparent top cover layer 42 and a transparent bottom cover layer 44 that are typically formed from glass or a polymeric material enclose the holographic storage medium 46 in FIG. 2A. FIG. 3A shows the envelope of the local index perturbation of holographic storage medium 46, for which the carrier frequencies have been removed. Generally a reflected signal from a focused beam will be strongest when it is centered on a peak.

FIG. 3B is a cross-sectional view of storage device 50 corresponding to the format hologram grating structure of FIG. 2B. A transparent top cover layer 52 and a transparent bottom cover layer 54 serve to enclose the holographic storage medium 56. Similar to FIG. 3A, FIG. 3B shows the envelope of the local index perturbation of holographic storage medium 56, for which the carrier frequencies have been removed. The magnitude profiles depicted in FIGS. 3A and 3B are a general indication of the expected reflectivity for a high numerical aperture, diffraction-limited beam focused into the holographic storage medium. The features of the format hologram grating structure and the relative thickness of the storage layer and cover layers are not to scale. The number of layers illustrated here is by way of example.

FIG. 2A and 2B and corresponding FIG. 3A and 3B illustrate format hologram grating structures that can be utilized for focusing and tracking using a variety of data writing methods, including data writing by selective alteration of the structure itself and data writing by affecting an optical property of the material without substantially affecting the underlying hologram grating structure.

Figure 4A:
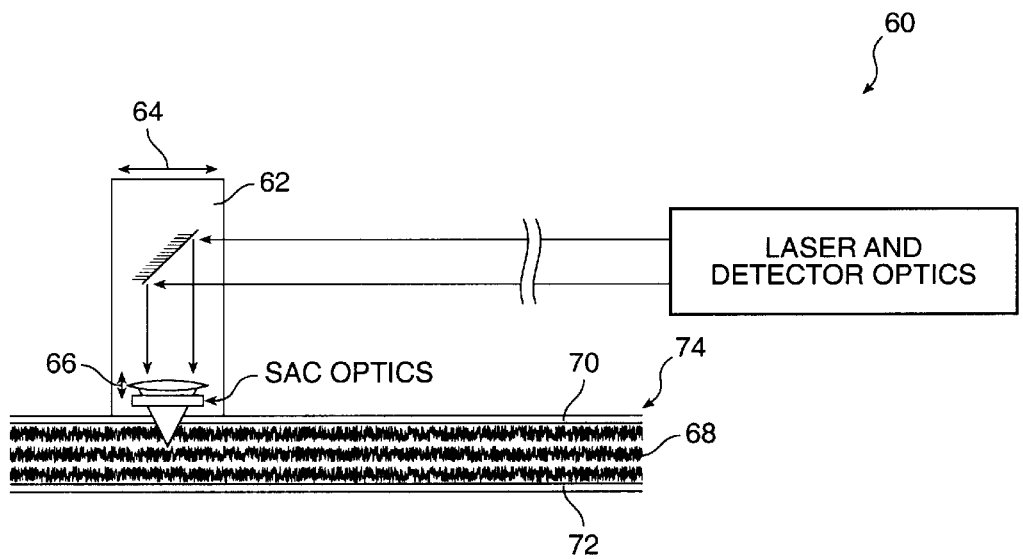
FIG. 4A is a schematic diagram of an optical head of an optical delivery and detection system in relation to a grating envelope of a depth only format hologram grating structure.

Referring now to FIG. 4A, a schematic of the optical head 62 component of an overall optical delivery and detection system 60 is shown. The optical head 62 can be moved radially, as shown by arrow 64, and in depth, as shown by arrow 66, to access different portions of a holographic storage medium 68. The illustrated holographic storage medium 68 has a format hologram grating structure stored therein. Other details of the structure of an optical head 62 for measuring intensity at a particular depth are not necessary for an understanding of the present invention and are omitted to avoid overcomplicating the disclosure. The construction of an optical head for measuring the intensity at a particular depth of the material can be found in U.S. patent application Ser. No. 09/016,382 filed on Jan. 30, 1998, in the name of inventor Hesselink et. al., entitled "Optical Data Storage by Selective Localized Alteration of a Format Hologram", previously expressly incorporated herein by reference.

In the case of a disk, rotation brings different angular portions of the holographic storage medium 68 into optical communication with the optical head 62. In the case of a medium formed in card or tape (not shown in FIG. 4A), linear motion brings different lateral portions of the holographic storage medium to the optical head. FIG. 4A illustrates the position of the optical head 62 in relation to a grating envelope of a depth only format hologram grating structure. The top layer 70 and the bottom layer 72 of the holographic storage device 74 can comprise glass or a polymeric material. As a function of the vertical position of the focus, the reflected intensity is greatest when the focus is positioned at the center of a layer, and least when positioned between the layers. By way of example, focus servo can be achieved by wobbling the head vertically, measuring the change in intensity, and directing the head to be positioned where the reflection is highest.

Figure 4B:
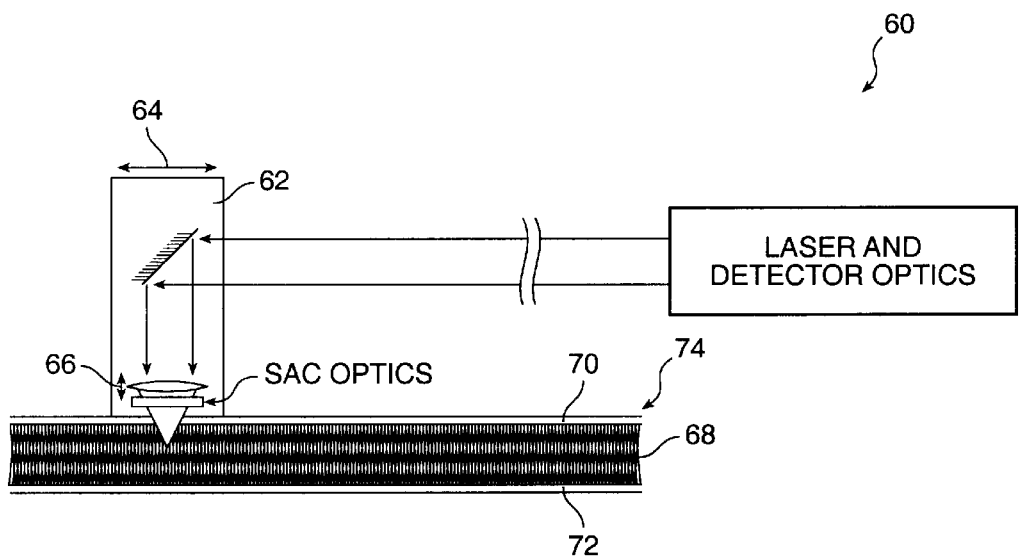
FIG. 4B is a schematic drawing of an optical head of an optical delivery and detection system in relation to a grating envelope of a depth and radial format hologram grating structure.

FIG. 4B illustrates an optical head 62 in relation to a grating envelope of a depth and radial format hologram grating structure. Layer selection may be achieved using the same simple focus servo; a tracking servo can be similarly achieved by wobbling the optical head 62 transversely, measuring the change in intensity, and directing the head to be positioned where the reflection is highest.

Figure 5:
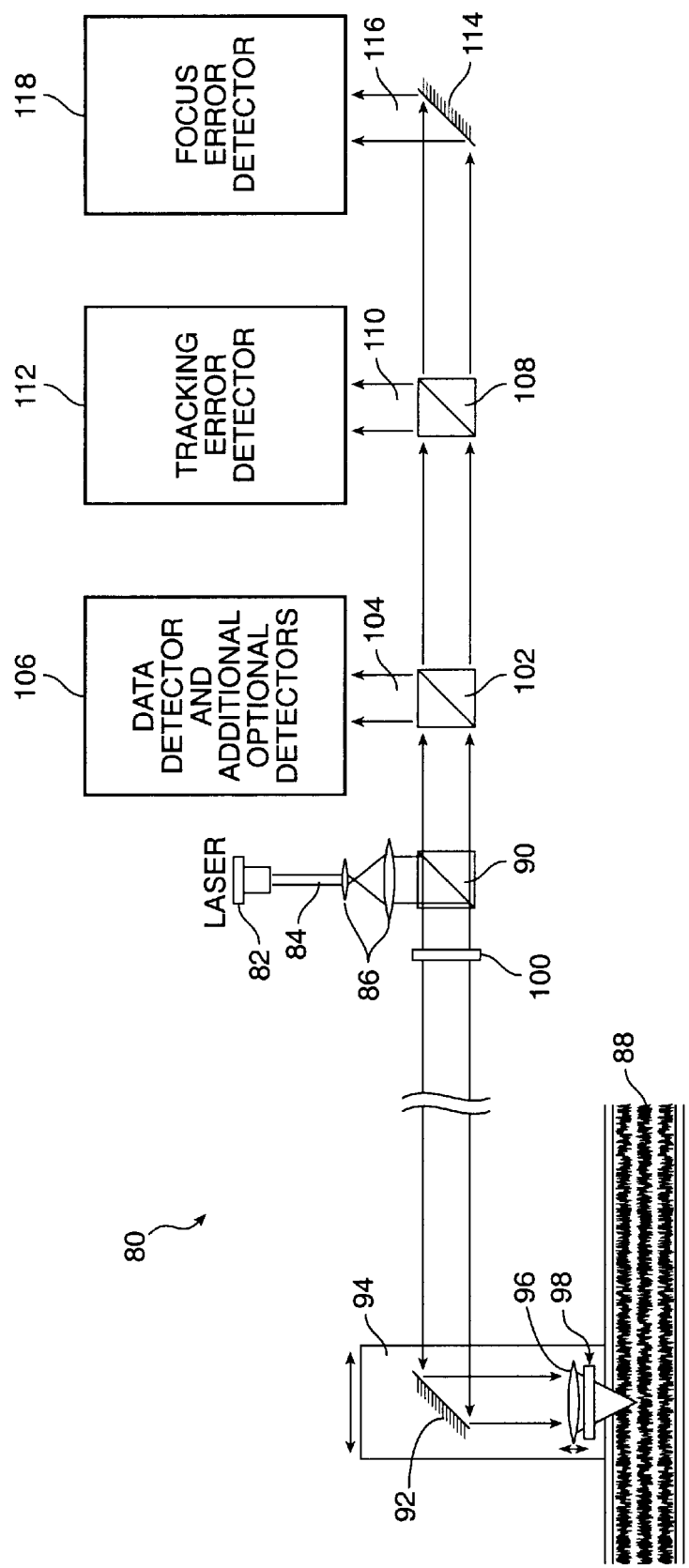
FIG. 5 is a schematic drawing of an optical delivery and detection system in relation to a grating envelope of a depth only format hologram grating structure.

FIG. 5 illustrates an optical delivery and detection system 80. A laser 82 illuminates a beam 84 that is expanded by beam expansion optics 86 and directed towards the holographic storage medium 88. Once the beam is expanded it passes through a polarizing beam splitter 90 where it is directed towards a first corner turning mirror 92 located within the optical head 94 and then directed towards an objective lens 96. Variable spherical aberration correction (SAC) optics 98 can be used in conjunction with an objective lens 96 to focus on different layers within the holographic storage medium 88. The use of SAC optics 98 is particularly important when trying to reach depths within the storage medium 88 in excess of approximately 100 microns. On the beam's forward and return paths, light passes through a quarter wave plate 100 that serves to change the polarization of the beam. The use of the polarizing beam splitter 90 and the quarter wave plate 100 serves to increase the efficiency of the overall system 80. Alternatively, a standard 50/50 beam splitter can be used in place of the polarizing beam splitter 90 and the quarter wave plate 100. Once the polarization has been changed, the beam passes through the polarizing beam splitter 90. The polarizing beam splitter 90 recognizes the change in polarization and directs the beam towards several operational paths. A fraction of the light is split in the direction of each path. A standard 50/50-beam splitter 102 directs a portion of the light in a data path 104 towards a data detector 106 and additional optional detectors (not shown in FIG. 4). The portion of light not directed toward the data path 104 is directed towards a second 50/50-beam splitter 108 that serves to direct a portion of the light in a tracking path 110 toward a tracking error detector 112. The portion of light not directed toward the tracking path 110 is directed towards optional second corner turning mirror 114. Finally, the light is reflected off the corner turning mirror 114 in an autofocus path 116 toward a focus error detector 118.

Figure 6:
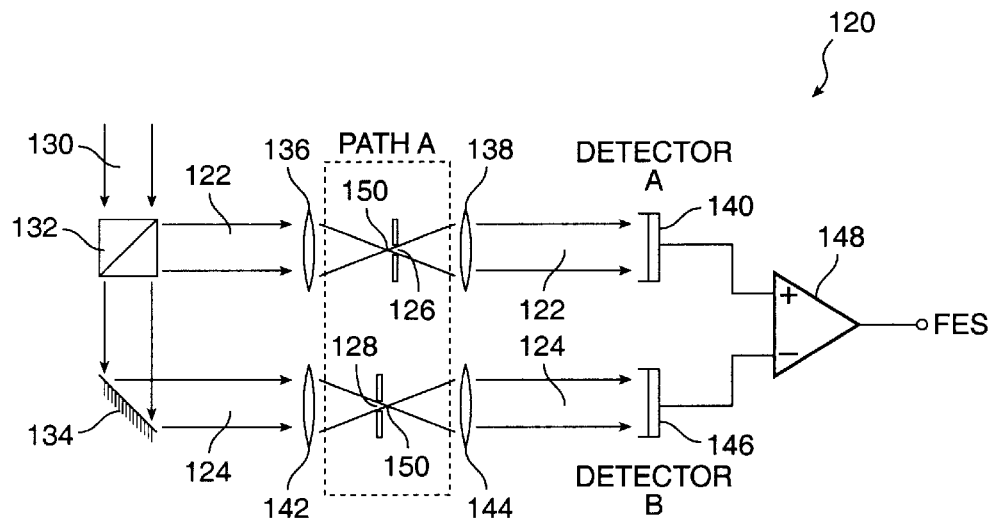
FIG. 6 is a schematic drawing of a focus error signal generator device, in accordance with a presently preferred embodiment of the present invention.

A presently preferred embodiment of the present invention is illustrated in FIG. 6. Shown in FIG. 6 is an improved focus error signal (FES) generator device 120 comprising two optical paths 122 and 124, and corresponding pinholes 126 and 128. With the present invention, an optical head (not shown in FIG. 6) focuses light onto a data layer in a data storage medium that has multiple layers of data storage and, in particular, bulk monolithic holographic storage media with a format hologram grating stored therein to define layers.

Light beam 130 is shown as a read beam on a return path from an optical storage medium. The optical storage medium may, preferably, have a format hologram grating structure stored therein to define data layers (not shown in FIG. 6), although the present invention can be used with media having a single data layer. Light beam 130 is directed towards a beam splitter 132 from which a fraction of the light proceeds along path 122 and the remaining beam is directed towards a corner turning mirror 134 where it is reflected and results in path 124. The implementation of beam splitter 132 is not an essential element of the presently preferred embodiment of the present invention. The beam splitter 132 serves to split light beam 130 into two distinct light paths: path 122 and path 124. Any other manner of splitting light beam 130 into two distinct light paths can also be implemented and will still be within the inventive concept herein disclosed.

Path 122 light travels through optical lens 136, pinhole 126 and optical lens 138 before light beam 122 contacts detector 140. Path 124 light travels through optical lens 142, pinhole 128 and optical lens 144 before light beam 124 contacts detector 146. Optical lens 136 and optical lens 142 are, typically, standard glass or plastic optical lenses that share similar focal lengths. Pinholes 126 and 128 are, typically, formed in a glass plate that is coated with a metal foil. Those skilled in the art will realize that the pinhole formation can be accomplished in a variety of manners. The pinhole configuration that is shown here is by way of example only and is not intended to be in any way limiting.

The size of the pinhole is dependent upon the focal length of optical lenses 136 and 142, the beam diameter and the beam wavelength. By way of example, the pinhole size may be sized so that 90% of the intensity of the light beam passes through the pinhole when the pinhole is positioned at the beam focus. The pinhole may typically range in size from about 1 micron in diameter to about 50 microns in diameter, and is typically about 8 microns in diameter. Optical lens 138 and optical lens 144 are, typically, standard glass optical lenses that share similar focal lengths. The lenses that are chosen as optical lenses 138 and 144 should be able to ensure that the light beams emitted from optical lenses 138 and 144 are collected efficiently by the corresponding detector 140 or detector 146.

Detector 140 and detector 146 may be standard photodiodes that serve to convert light beam photons to electrical signals in the form of electrons (an electrical current). The electrical signal is then provided to electronic differencing circuit 148 that generates a focus error signal. A servo system (not shown in FIG. 6) uses the focus error signal to direct the position of the objective lens in the optical head, thus completing the auto-focus procedure. Servo systems are well known in the art.

In contrast, in a prior-art data detection arm (shown in FIG. 5 at 106), a pinhole is generally used for confocal depth selection, and is generally situated so that light reflected from the desired depth—the focus of the read beam—comes to a focus in the plane of the pinhole, passing efficiently through it. For the device shown in FIG. 6, the pinholes are positioned in the separate arms so that they are displaced to either side of this focus when the beam is focused at the center of the layer. Thus, when the optical head is focused on a layer, the point of focus 150 in FES generator device 120 occurs before pinhole 126 for path 122 and after pinhole 128 for path 124. Point of focus 150 occurs within the focal plane (not shown in FIG. 6) of the corresponding optical lens 136 and 142. For this configuration, the intensities of the beams propagating through the paths 122 and 124 are the same.

The plates containing the pinholes are characteristically mounted within a FES generator device housing (not shown in FIG. 6) with the aid of a precision alignment fixture. Use of such alignment fixtures to position elements such as pinhole plates are well known by those of ordinary skill in the art.

Figure 7A:
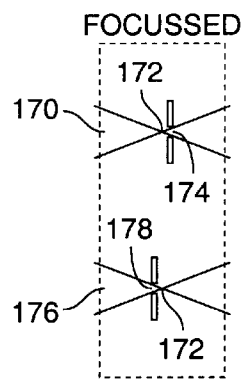
FIG. 7A is an illustration of an example of ideal positioning of the points of focus in relation to the pinholes, in accordance with a presently preferred embodiment of the present invention.

The positioning of the point of focus in relation to the pinholes is instrumental in determining proper auto-focus. The ideal positioning of the point of focus is shown in FIG. 7A. This ideal positioning is achieved when the optical head is properly focused on the desired layer within the storage medium with respect to the depth of a data layer or layer center. Path 170 point of focus 172 occurs slightly before pinhole 174 and path 176 point of focus 172 occurs slightly after pinhole 178.

Figure 7B:
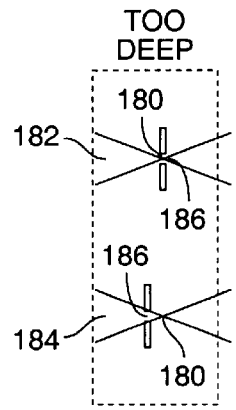
FIG. 7B is an illustration of an example of point of focus positioning in relation to the pinholes when the light beam is focussed too deeply within the storage medium, in accordance with a presently preferred embodiment of the present invention.
Figure 7C:
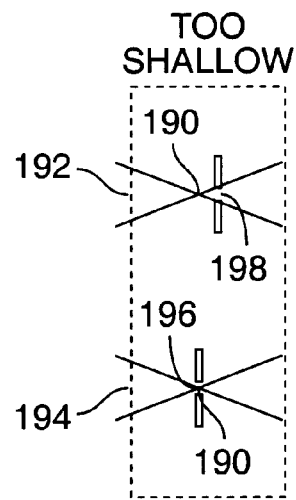
FIG. 7C is an illustration of an example of point of focus positioning in relation to the pinholes when the light beam is focussed too shallowly within the storage medium, in accordance with a presently preferred embodiment of the present invention.

FIGS. 7B and 7C illustrate light beams that are focused either too deeply or too shallowly within the storage medium with respect of the depth of a layer or layer center. FIG. 7B gives an example of focusing too deeply within the storage medium. If the optical head is focused too deeply into the medium, point of focus 180 in the FES generator device is shifted towards the detectors (not shown in FIG. 7B) for both paths 182 and 184. For moderate perturbations, point of focus 180 is more tightly focused at pinhole 186 in path 182 and is less tightly focused at pinhole 188 in path 184. Therefore, more light is transmitted through pinhole 186 in path 182 than pinhole 188 in path 184 and therefore more light is detected by the detector corresponding to pinhole 186 than the detector corresponding to pinhole 188. FIG. 7C provides an example of the optical head being focused too shallowly into the medium, resulting in point of focus 190 in the FES generator device being shifted away from the detector for both paths 192 and 194. For moderate perturbations, it is more tightly focused at pinhole 196 in path 194 and less tightly focused at pinhole 198 in path 192. Therefore, more light is transmitted throughout pinhole 196 in path 194 than pinhole 198 in path 192 and therefore more light is detected by the detector corresponding to pinhole 196 than the detector corresponding to pinhole 198. Thus, a simple difference in the intensities of the light indicates in which direction the optical head is out of focus.

Figure 8:
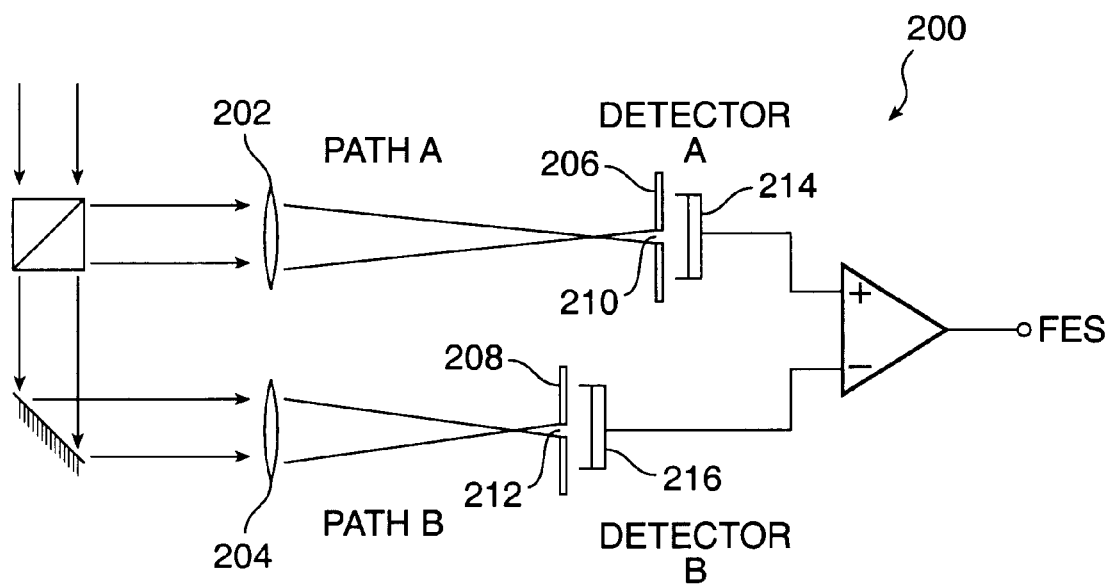
FIG. 8 is a schematic drawing of a focus error signal generator device having only one set of optical lenses, in accordance with a presently preferred embodiment of the present invention.

When the focal lengths of the lenses focusing the light to the pinholes are large, lateral pinhole positioning tolerances are reduced. It is particularly advantageous in this case to modify the arrangement shown in FIG. 6 so that the detectors are adjacent to the pinholes, as illustrated in FIG. 8, a diagram showing another presently preferred embodiment of the present invention comprising a FES generator device 200 that eliminates the need for a second set of optical lenses. In this embodiment the first set of optical lenses 202 and 204 have a characteristically large focal length. The large focal lengths of optical lenses 202 and 204 dictate that plates 206 and 208 containing pinholes 210 and 212 be placed at a greater distance from optical lenses 202 and 204 than was observed in the embodiment depicted in FIG. 6. Detector 214 and detector 216 must be placed close enough to pinholes 210 and 212 that nearly all light from pinholes 210 and 212 irradiates detector 214 and detector 216.

A simple differencing circuit can be employed to generate a focus error signal in the present invention. Detector A outputs a current which is converted to a voltage A, and detector B outputs a current that is converted to a voltage B. Current-to-voltage techniques are well known in the art. The focus error signal (A−B) is positive when the focus is too deep, and negative when the focus is too shallow. Furthermore, the signal (A−B) is stronger as the beam is further out of focus. The focus error signal can be further normalized to the total strength (A+B) in order to compensate e.g. for fluctuations in laser strength. The focus error signal can be used to position the optical head so that it focuses on a layer e.g. by defining the minimum and maximum tolerable value limits D1<(A−B)÷(A+B)<D2; where D1 is the minimum limit and D2 is the maximum limit. When the normalized focus error signal (A−B)÷(A+B) falls outside this range, the head is moved in the appropriate direction to bring it within this range, thus focusing on a particular layer.

Figure 9A:
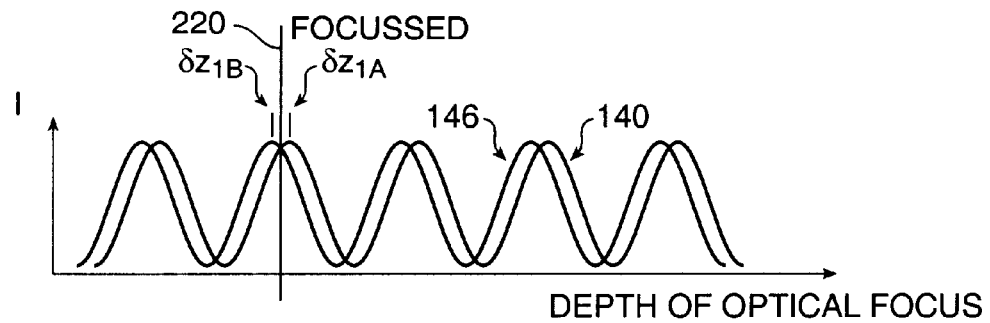
FIG. 9A is a graphical representation of signal intensity versus depth of optical focus for two detectors, in accordance with a presently preferred embodiment of the present invention.
Figure 9B:
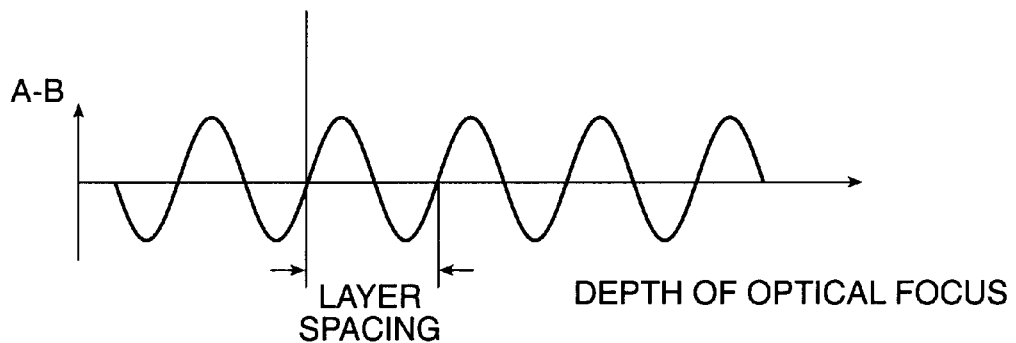
FIG. 9B is a graphical representation of the strength of the focus error signal versus depth of optical focus, in accordance with a presently preferred embodiment of the present invention.

Referring now to FIG. 9A, signal intensities for detector A and detector B are shown as a function of depth of the material. The vertical line 220 indicates a particular depth of a formatted layer. At this depth, detector A and detector B provide the same output voltage that corresponds to the same signal strength. Referring now to FIG. 9B, the value of the focus error signal (A−B) is shown as a function of depth of the material. If the beam from the optical head is focused too deeply with respect to the nearest layer, then the focus error signal (A−B) is positive, and therefore the normalized focus error signal (A−B)÷(A+B) is positive. If the beam from the optical head is focused too shallowly with respect to the nearest layer, then the focus error signal (A−B) is negative, and therefore the normalized focus error signal (A−B)÷(A+B) is negative. Both the value of the focus error signal (A−B) and its slope can be used together to determine the direction and distance the optical head must be moved to restore focus to the nearest layer. Alternatively, the value of the normalized focus error signal and its slope can be used together to determine the direction and distance the optical head must be moved to restore focus to the nearest layer. Furthermore, the value of the focus error signal (A−B) and its slope can be used to supplement the evaluations based on a normalized focus error signal. Layer selection is accomplished by keeping track of the number of layers crossed as the optical head passes from the first layer it encounters to the others.

Figure 10:
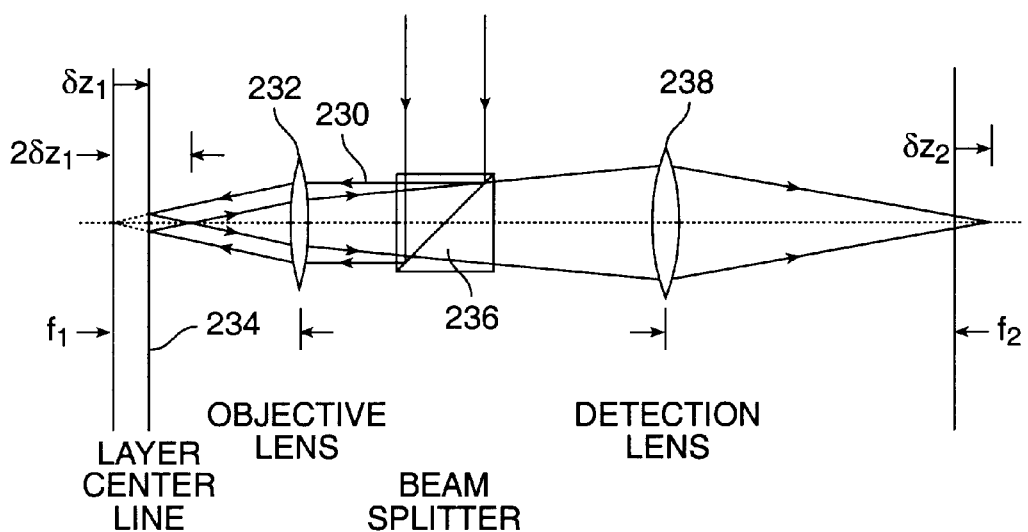
FIG. 10 is a schematic drawing of an optical head showing the general effect on the light beams when the head is not focused properly.

The strength of the focus error signal defined by (A−B) in FIG. 9B is proportional to the phase shift of the two signals A and B, illustrated in FIG. 9A. This relationship can be understood by referring to FIG. 10, which shows the general effect on the light beams when the head is not focused on a layer. FIG. 10 does not include all critical parts of the optical head, such as a spherical aberration corrector, but illustrates the effects of out-of-focus head position. For clarity, the figure does not illustrate effects of the index of refraction of the material; these effects would be apparent to those skilled in the art of optical sciences. In FIG. 10, the layer is indicated by a single reflecting surface for illustration purposes only.

A light beam 230 passes through the objective lens 232, is reflected by the layer 234, turns through the objective lens 232, passes through the beam splitter 236, and is then focused by the detection lens 238. The focal position of the light returning to the objective lens 232 is shifted by twice the depth positioning error. As would be apparent to those skilled in the optical sciences, the focus position in the detection optics therefore shifts by $\delta z_2 = (2\delta z_1/n)(f_2/f_1)^2$. In this equation n is the index of refraction of the material, $f_1$ is the focal length of objective lens 232, $f_2$ is the focal length of the detection lens 238, $\delta z_1$ is the depth positioning error, and $\delta z_2$ is the focal shift in the FES generator. An axial pinhole displacement $\delta z_2$ therefore results in a detected phase shift of $\delta z_1 = (n/2)\delta z_2 (f_1/f_2)^2$ as illustrated in FIG. 9A.

The strongest focus error signal (A−B) is achieved when the axial pinhole displacement is set such that the displacement of the pinhole from the point of focus for path A is adjusted to optionally detect a depth positioning error of $\delta z_{1A} = (\frac{1}{4})\Delta z$, and for path B is adjusted to optionally detect a depth positioning error of $\delta z_{1B} = -(\frac{1}{4})\Delta z$, where $\Delta z$ is the spacing of the layers as measured by the optical focus displacement (FIG. 9B). For data detection, however, it is generally preferred that the pinhole reside near the point of focus of the beam, for which the displacement would be less than the Rayleigh range of the optical focus in the material (e.g. $\delta z_{1A} = -\delta z_{1B} = (\frac{1}{2})z_R$, where $z_R$ is the Rayleigh range of the beam focused in the material). Thus, it is generally preferred that the data detection and focus error generation optics described herein are in separate arms/paths (as shown in FIG. 5)

Equivalently, the condition for strongest focus error signal can be cast in terms of the pinhole placement with respect to the layer spacing imaged by the detection lens 238. In these terms, the strongest focus error signal (A−B) is achieved when the axial pinhole displacement from the point of focus for path A is $\delta z_{2A} = (\frac{1}{4})\Delta z'$, and for path B is $\delta z_{2B} = -(\frac{1}{4})\Delta z'$, where $\Delta z' = (2\Delta z/n)(f_2/f_1)^2$ which is the spacing of the layers as measured by the optical focus displacement (FIG. 9B). If it is required that the two signals A, B be in focus (e.g. to detect data), then the phase shift should be reduced to less than the Rayleigh range of the optical focus of the detection lens (e.g. $\delta z_{2A} = -\delta z_{2B} = (\frac{1}{2})z_R'$, where $z_R'$ is the Rayleigh range of the beam focused by the detection lens).

In an alternative preferred embodiment of the present invention, a focus error signal (B−A) can be generated to keep the beam focused on the nulls between data layers. This may be advantageous for data recording that does not utilize selective localized alteration of a format hologram.

Due to the properties of confocal detection, the pinhole diameter should be less than or equal to the diameter of the optical beam reflected from the material for optimal rejection of out-of-focus signals from other layers. In contrast, for maximum signal strength and positioning tolerance, the pinhole diameter should be greater than or equal to the optical beam diameter. A particular choice that balances these constraints is to set the pinhole size to just pass nearly all of the optical intensity of the non-aberrated beam. By way of example, the pinhole size can be selected so that 90% of intensity of the light beam passes through the pinhole when the pinhole is positioned at the beam focus.

The present invention can also be practiced to keep an optical head focused on tubular format regions (tubular format cross-sectional regions are illustrated in the storage medium of FIGS. 2B, 3B and 4B). The round cross sections sweep out tubular format regions throughout the radius of the material that result from complex format hologram grating structures. In this case, the reflected light detected by the system is relatively small between the tubes. Thus, the beam must be kept radially positioned on the data tube in order to remain focused on a particular data layer. Some tracking methods used for single layer and multiple media layer storage devices can be adapted for use in this invention as disclosed. By way of example, one such method of tracking comprises wobbling the focused spot radially, measuring the change in intensity, and directing the head to be positioned where the reflection is highest which correspond to the track centers. The operation of the focus error generator device of the present invention is otherwise the same.

Figure 11A:
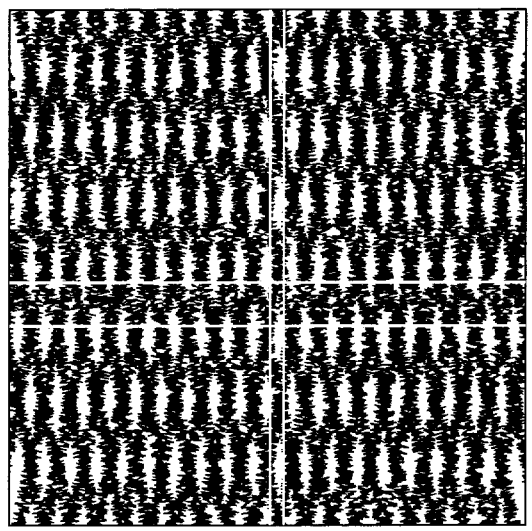
FIGS. 11A, 11B and 11C, respectively, are graphical representations of the strength of the reflected signal as a function of the vertical and transverse dimension within the optical storage medium; the strength of the reflected signal as a function of transverse dimension for two adjacent layers within the optical storage medium; and, the strength of the reflected signal as a function of the vertical dimension for two adjacent track positions within the optical storage medium, respectively.
Figure 11B:
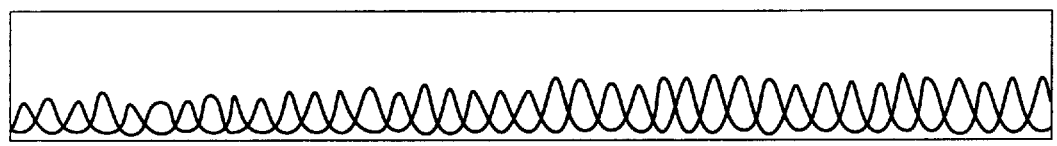
Figure 11C:
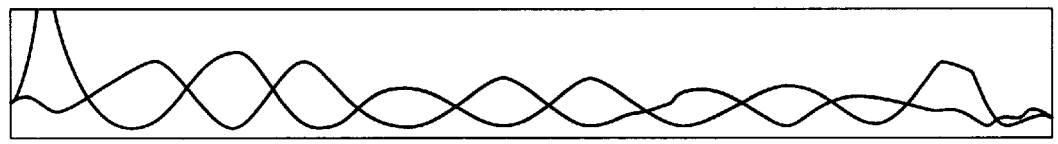
Figure 12:
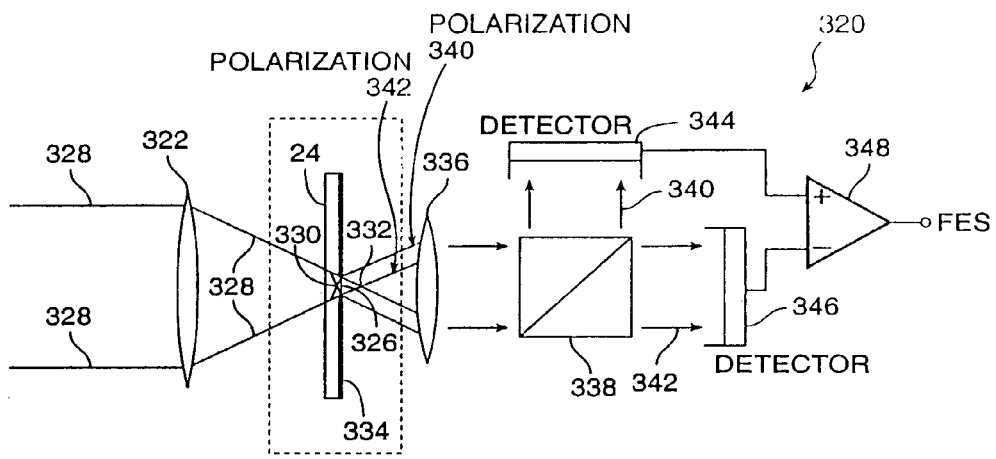
Figure 13A:
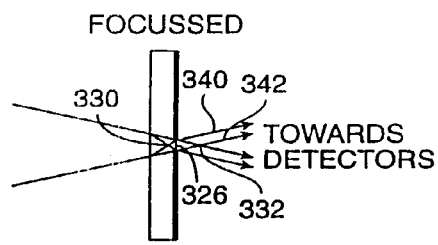
Figure 13B:
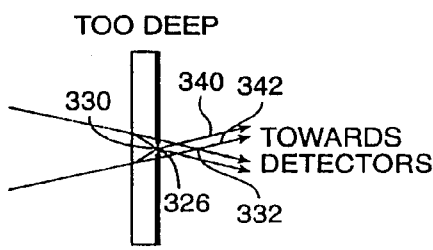
Figure 13C:
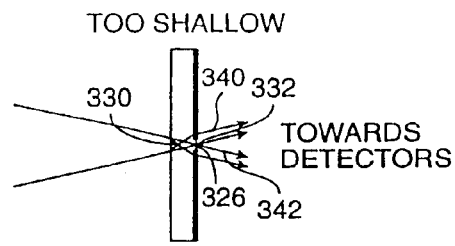
Figure 14:
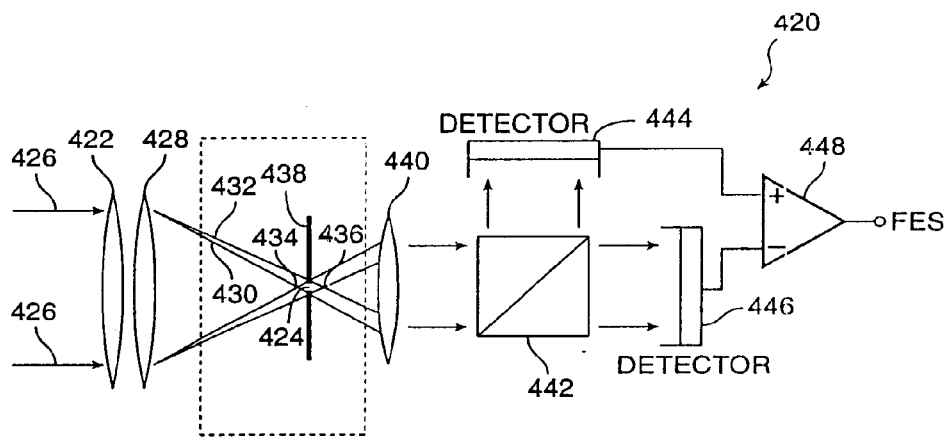
Figure 15A:
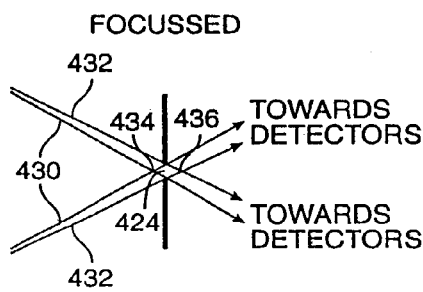
Figure 15B:
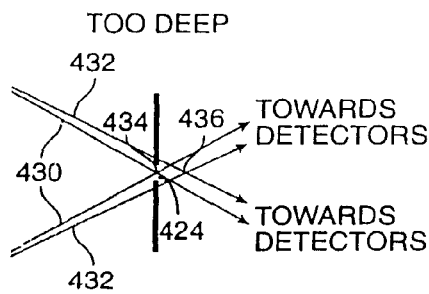
Figure 15C:
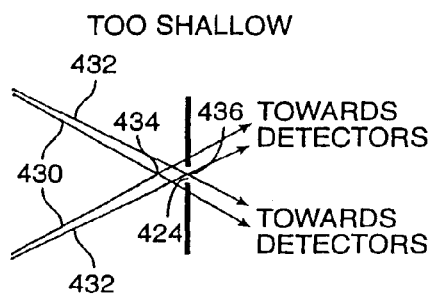
Figure 16:
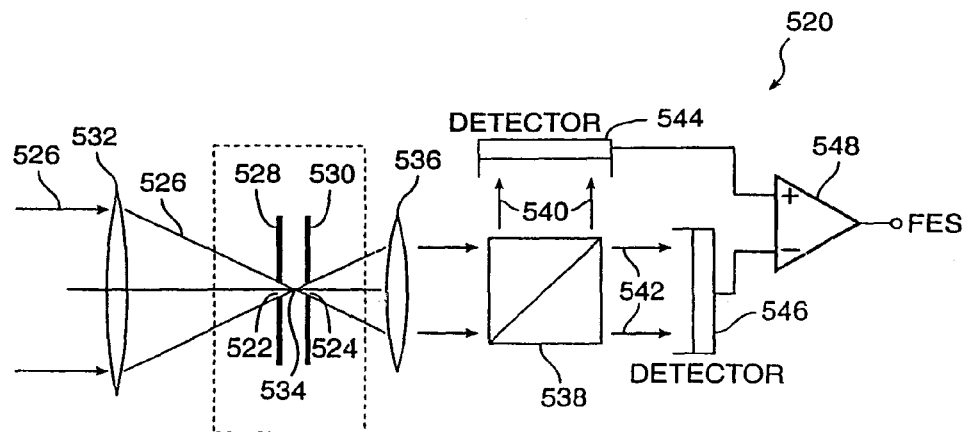
Figure 17A:
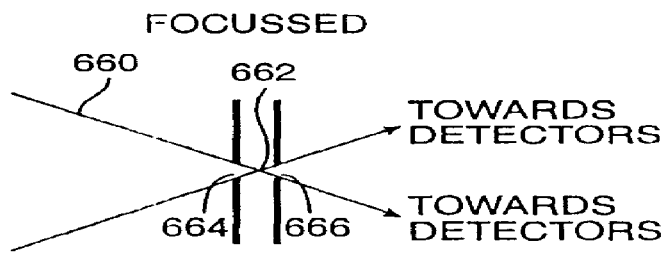
Figure 17B:
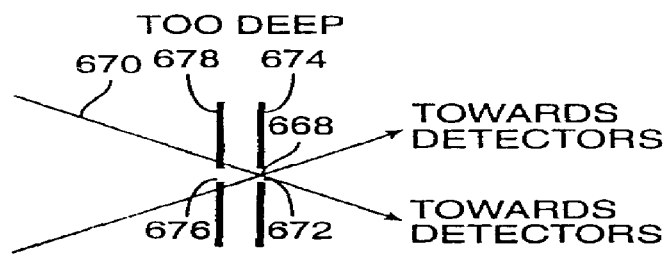
Figure 17C:
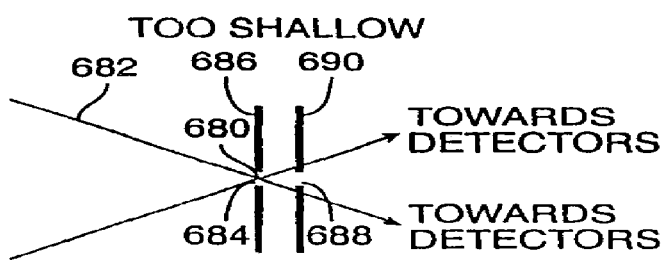

Referring now to FIGS. 11A, 11B and 11C, data are shown for the strength of light reflected off a format hologram grating structures that defines layers and tracks which together define tubular format regions. FIG. 11A shows the strength of the reflected signal as a function of the depth (vertical dimension) and the radius (transverse dimension) within the storage medium at a fixed angular position. FIG. 11B shows the strength of the reflect signal as a function of radius (transverse dimension) for two adjacent layers within the storage medium. Note that adjacent tracks are shifted in phase by half a period. FIG. 11C shows the strength of the reflected signal as a function of depth (vertical dimension) for two adjacent track positions. Note that these layers may be placed as closed as only a few times the depth of field of the readout optical beam.

Although illustrative presently preferred embodiments and applications of this invention are shown and described herein, many variations and modifications are possible which remain within the concept, scope and spirit of the invention, and these variations would become clear to those skilled in the art after review of this disclosure. The invention, therefore is not limited except in spirit of the appended claims.

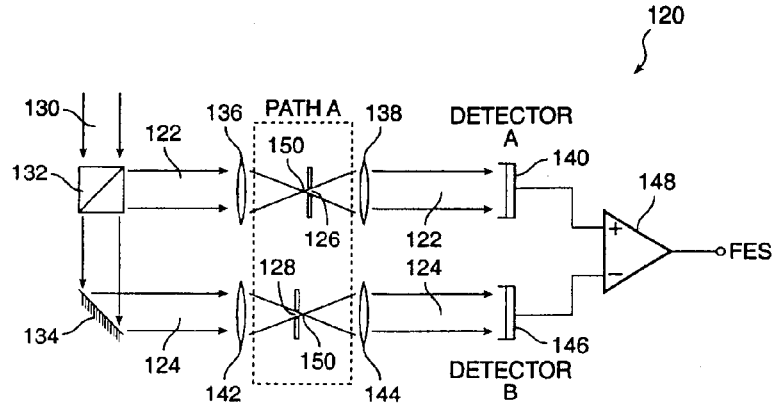

What is claimed is:

1. An apparatus for generating a focus error signal from a read light beam returning from an optical storage media comprising:

a first optical lens disposed in the path of a first light beam derived from said read light beam, said first optical lens having a first focal plane;

a second optical lens disposed in the path of a second light beam derived from said read light beam, said second optical lens having a second focal plane;

a first optical detector disposed in the path of said first light beam, said first optical detector after said first focal plane;

a second optical detector disposed in the path of said second light beam after said second focal plane;

a first pinhole disposed in the path of said first light beam after said first optical lens, said first pinhole positioned after said first focal plane and before said first optical detector;

a second pinhole disposed in the path of said second light beam after said second optical lens, said second pinhole positioned before said second focal plane and before said second optical detector; and an electrical differencing circuit having a first input coupled to said first optical detector, a second input coupled to said second optical detector and an output.

2. An apparatus in accordance with claim 1, wherein said electrical differencing circuit generates a focus error signal related to the difference between the output of said first optical detector and the output of said second optical detector.

3. An apparatus in accordance with claim 1, wherein said electrical differencing circuit generates a focus error signal related to the difference between the distance from said first focal plane to said first pinhole and the distance from said second focal plane to said second pinhole.

4. An apparatus in accordance with claim 1, further comprising:

a beam splitter disposed in the path of said read beam returning from an optical storage media, said beam splitter splitting said read light beam returning from an optical storage media into said first light beam and said second light beam.

5. An apparatus in accordance with claim 1, further comprising:

a third optical lens disposed in the path of said first light beam after said first focal plane and before said first optical detector; and a fourth optical lens disposed in the path of said second light beam after said second focal plane and before said second optical detector.

6. An apparatus in accordance with claim 1, wherein said first and second pinholes have diameters that allows for the passage of about 90% of the intensity of said first and second beams of light, respectively, when said first and second pinholes are positioned at their respective points of focus.

7. An apparatus for generating a focus error signal from a read light beam returning from an optical storage media:

means for focussing a first light beam derived from said read light beam at a first point of focus within a first focal plane;

means for focussing a second light beam derived from said read light beam at a second point of focus within a second focal plane spaced apart from said first point of focus;

means for first optical detection in the path of said first light beam after said first focal plane;

means for second optical detection in the path of said second light beam after said second focal plane;

means for a first confocal light beam filtration in the path of said first beam of light, said first confocal light beam filtration means positioned after said first focal plane and before said means for first optical detection;

means for a second confocal light beam filtration in the path of said second light beam, said second confocal light beam filtration means positioned before said second focal plane and before said means for second optical detection; and means for generating a focus error signal related to the difference between an output from said means for first optical detection and an output from said means for second optical detector.

8. A method for generating a focus error signal from a read light beam returning from an optical storage media comprising the steps of:

focussing a first light beam derived from the read light beam at a first point of focus within a first focal plane;

focussing a second beam of light derived from said read light beam at a second point of focus within a second focal plane;

providing a first optical detector in the path of said first light beam after said first focal plane;

providing a second optical detector in the path of said second light beam after said second focal plane;

providing a first pinhole in the path of said first beam of light after said first point of focus in said first focal plane and before said first optical detector;

providing a second pinhole in the path of said second light beam before said second point of focus in said second focal plane and before said second optical detector; and generating a focus error signal related to the difference between an output from said first optical detector and an output from said second optical detector.

9. A method in accordance with claim 8, wherein the step of generating a focus error signal further comprises:

generating a focus error signal related to the difference between the distance from said first point of focus to said first pinhole and the distance from said second point of focus to said second pinhole.

10. A method in accordance with claim 8, further comprising the steps of:

splitting said read light beam returning from an optical storage media into said first light beam and said second light beam.

11. A method in accordance with claim 10, further comprising the substep of:

providing a beam splitter to receive said read light beam returning from an optical storage media, said beam splitter outputting said first light beam and said second light beam.

12. A method in accordance with claim 8, further comprising the steps of:

providing a first optical lens through which said first light beam passes to create said first point of focus within said first focal plane; and providing a second optical lens through which said second light beam passes to create said second point of focus within said second focal plane.

13. A method in accordance with claim 8 further comprising the steps of:

providing a third optical lens through which said first light beam passes after said first focal plane and before said first optical detector; and providing a fourth optical lens through which said second light beam passes after said second focal plane and before said second optical detector.

14. A method in accordance with claim 8, further comprising the steps of:

positioning said first pinhole before said first focal plane; and positioning said second pinhole after said second focal plane.

15. A method in accordance with claim 8, further comprising the steps of:

positioning said first pinhole after said first focal plane; and positioning said second pinhole before said second focal plane.

16. A method in accordance with claim 8 further comprising the steps of:

providing said first pinhole with a diameter that allows for passage of about 90% of the intensity of said first beam of light when said first pinhole is positioned at said first point of focus; and providing said second pinhole with a diameter that allows for passage of about 90% of the intensity of said second beam of light when said second pinhole is positioned at said second point of focus.

17. A system for optical delivery and detection comprising:

a laser source that emits a first light beam;

an optical head that receives said first light beam;

an optical lens within said optical head that focuses said first light beam on a location within a storage media;

a data detector that receives said first light beam returning from said storage media and provides data signals;

a tracking error detector that receives said first light beam returning from said storage media and provides a tracking error signal to said optical head; and a focus error signal generator that receives said first light beam returning from said optical storage media and provides a focus error signal to said optical head, said focus error signal generator including:

a first optical lens disposed in the path of a second light beam derived from said first light beam, said first optical lens having a first focal plane;

a second optical lens disposed in the path of a third light beam derived from said first light beam, said second optical lens having a second focal plane;

a first optical detector disposed in the path of said second light beam after said first focal plane;

a second optical detector disposed in the path of said third light beam after said second focal plane;

a first pinhole disposed in the path of said second light beam, said first pinhole positioned after said first optical lens, after said first focal plane and before said first optical detector;

a second pinhole disposed in the path of said third light beam, said second pinhole positioned after said second optical lens, before said second focal plane and before said second optical detector; and an electrical differencing circuit having a first input coupled to said first optical detector, a second input coupled to said second optical detector and an output.

18. A system in accordance with claim 17, wherein said storage media has layer separation ($\Delta z$), said layer separation having a corresponding spacing ($\Delta z'$) as measured by an optical focus displacement and wherein said first pinhole is placed ($\frac{1}{4}$) $\Delta z'$ from said first focal plane and said second pinhole is placed $-(\frac{1}{4})$ $\Delta z'$ from said second focal plane.

* * * * *

UNITED STATES PATENT AND TRADEMARK OFFICE
CERTIFICATE OF CORRECTION

PATENT NO.    : 6,111,828
DATED         : August 29, 2000
INVENTOR(S)   : Robert R. McLeod et al.

It is certified that error appears in the above-identified patent and that said Letters Patent is hereby corrected as shown below:

Title page,
Replace title page with the attached title page

Drawings,
Add Sheets 11-14 consisting of Figs. 12-17c as shown on the attached pages.

Signed and Sealed this

Eleventh Day of November, 2003

JAMES E. ROGAN
*Director of the United States Patent and Trademark Office*

United States Patent
McLeod et al.

[11] Patent Number: 6,111,828
[45] Date of Patent: Aug. 29, 2000

[54] FOCUS ERROR SIGNAL GENERATION USING CONFOCALLY FILTERED DETECTION

[75] Inventors: Robert R. McLeod, Morgan Hill; Mark E. McDonald, Mountain View, both of Calif.

[73] Assignee: Siros Technologies, Inc., San Jose, Calif.

[21] Appl. No.: 09/229,140

[22] Filed: Jan. 12, 1999

[51] Int. Cl.[7] ............................................. G11B 7/09
[52] U.S. Cl. ...................... 369/44.23; 369/112; 369/118
[58] Field of Search ............................. 369/44.23, 44.24, 369/44.25, 44.27, 44.28, 44.41, 118, 112

[56] References Cited

U.S. PATENT DOCUMENTS

| | | | |
|---|---|---|---|
| 4,318,581 | 3/1982 | Guest et al. | 350/3.74 |
| 4,458,345 | 7/1984 | Bjorklund et al. | 369/103 |
| 4,467,462 | 8/1984 | Shibata | 369/45 |
| 4,775,968 | 10/1988 | Ohsato | 369/46 |
| 4,924,455 | 5/1990 | Fujie et al. | 369/44.21 |
| 5,202,875 | 4/1993 | Rosen et al. | 369/94 |
| 5,263,011 | 11/1993 | Maeda et al. | 369/44.27 |
| 5,283,777 | 2/1994 | Tanno et al. | 369/108 |
| 5,408,453 | 4/1995 | Holtslag et al. | 369/44.23 |
| 5,430,701 | 7/1995 | Ito et al. | 369/44.23 X |
| 5,499,231 | 3/1996 | Fennema et al. | 369/124 |
| 5,513,158 | 4/1996 | Ohsato | 369/44.23 |
| 5,526,336 | 6/1996 | Park et al. | 369/94 |
| 5,559,773 | 9/1996 | Kentatsu et al. | 369/44.42 |
| 5,590,110 | 12/1996 | Sato | 369/44.24 X |
| 5,610,895 | 3/1997 | Izumi et al. | 369/118 X |
| 5,627,814 | 5/1997 | Lee | 369/116 |
| 5,671,207 | 9/1997 | Park | 369/112 |
| 5,682,372 | 10/1997 | Yamakawa et al. | 369/94 |
| 5,691,971 | 11/1997 | Kim | 369/112 |
| 5,696,743 | 12/1997 | Kawasaki et al. | 369/32 |
| 5,701,288 | 12/1997 | Seong | 369/112 |
| 5,737,294 | 4/1998 | Yamakawa et al. | 369/99 |
| 5,737,295 | 4/1998 | Lee | 369/103 |
| 5,740,136 | 4/1998 | Tsutsui et al. | 369/44.25 |
| 5,748,597 | 5/1998 | Kim | 369/94 |
| 5,754,512 | 5/1998 | Komma et al. | 369/112 |
| 5,757,744 | 5/1998 | Akkermans | 369/44.25 |
| 5,764,606 | 6/1998 | Fukumoto et al. | 369/44.41 |
| 5,768,242 | 6/1998 | Juday | 369/103 |
| 5,790,493 | 4/1998 | Takeya et al. | 369/58 |
| 5,793,720 | 8/1998 | Nishikata | 369/44.25 |
| 5,793,721 | 8/1998 | Akkermans | 369/44.27 |
| 5,811,789 | 9/1998 | Nix | 250/201.2 |

*Primary Examiner*—Muhammad Edun
*Attorney, Agent, or Firm*—Sierra Patent Group, Ltd.

[57] ABSTRACT

A focus error signal generator device including first and second optical lenses disposed in the respective paths of first and second light beams derived from the return read beam wherein the first and second optical lens have corresponding points of focus, and first and second detectors disposed in the corresponding paths of the first and second light beams located after the points of focus. First and second pinholes are disposed in the corresponding paths of the first and second light beams after the corresponding optical lens and before the corresponding detector, and an electrical differencing circuit having inputs to the first and second detectors and an output to an optical head servo system. A method for focus error signal includes the steps of focussing first and second light beams derived from a return read beam at corresponding first and second points of focus; providing for first and second detectors disposed in the path of corresponding first and second light beams after corresponding first and second points of focus; providing for first and second pinholes in the path of corresponding first and second light beams; and generating a focus error signal related to the difference between the output of the first detector and an output of the second detector. An optical data delivery and detection system comprises a laser source emitting a light beam, an optical head that receives the light beam, optical lenses within the optical head that focus the light beam on an optical storage media, a data detector that receives the light beam on the beam's return path and provides data signals and the focus error generator device described above.

18 Claims, 14 Drawing Sheets